Patented Feb. 13, 1951

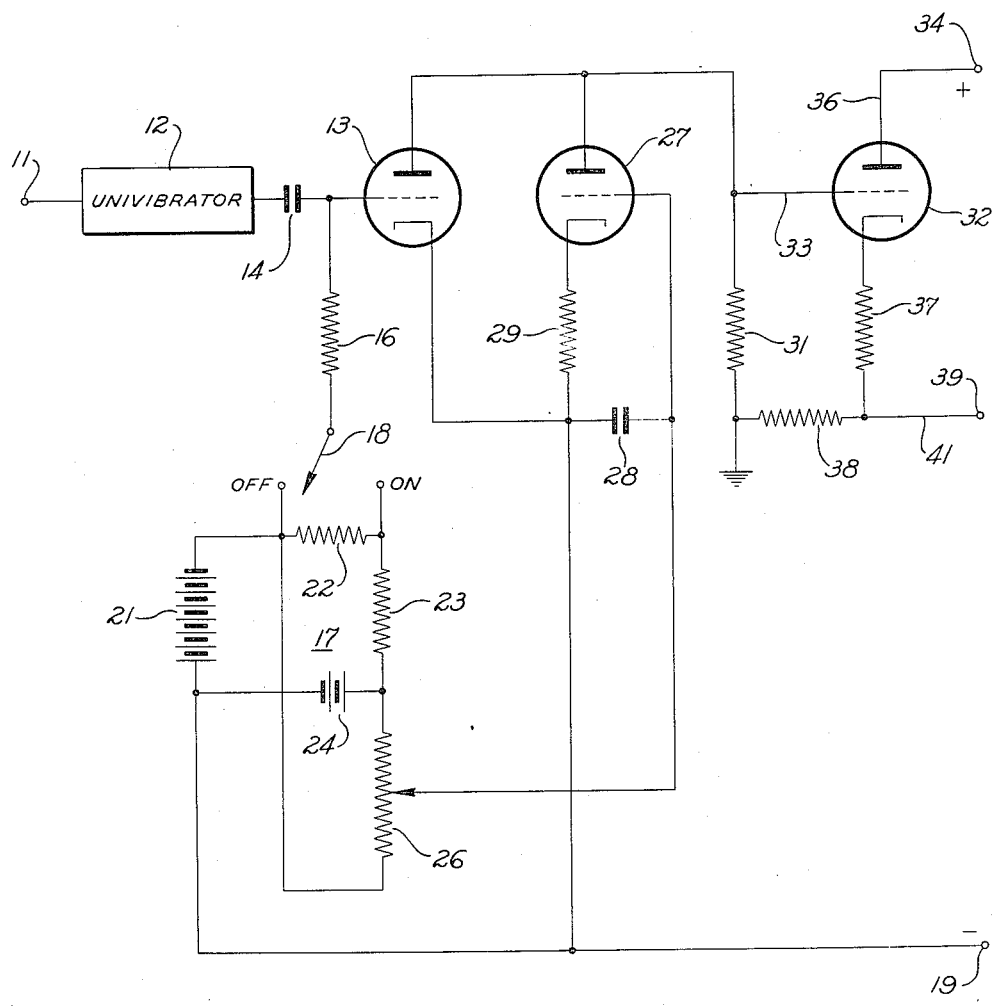

2,541,940

UNITED STATES PATENT OFFICE 2,541,940

ELECTRONIC CIRCUIT

Bruno B. Rossi, Cambridge, Mass., and Hans H. Staub, Palo Alto, Calif., assignors to the United States of America as represented by the United States Atomic Energy Commission Application July 30, 1948, Serial No. 41,424

4 Claims. (Cl. 250—27)

This invention relates to electronic circuits and more particularly to circuits for measuring instruments whereby the steady state conditions are nullified and true measurements obtained.

It has been found useful in the calibration of measurement instruments to determine the deviation between a steady state condition and a zero point. Thus, for example, in radiological studies, the current produced in an ionization chamber under steady state conditions can be accurately determined in relation to a zero point in either of two ways. The first and most obvious one is to turn off the ionization current. The second method, proposed by the present invention, permits continuous operation of the ionization chamber by reducing the steady state current to zero through the employment of a predetermined pulse of opposite sign, but equal in magnitude to the current. A natural difficulty encountered in such an arrangement is the occurrence of transient currents. The circuit of the present invention eliminates this difficulty.

It is therefore an object of this invention to provide an electronic circuit which produces a pulse equal and opposite to that of a steady state condition.

It is another object of the invention to provide a pair of vacuum tubes driving a third tube in such a manner that an output is produced which is equal and opposite to that of a steady state condition.

Still another object of the invention is to provide an electronic circuit for use with measuring devices which is capable of producing a transient-free output voltage to cancel out a steady state voltage.

Further objects and advantages will be apparent from the following description considered together with the attached drawing, in which:

The figure is a schematic wiring diagram embodying the invention and is the sole drawing thereof.

Referring to the drawing in detail, there is shown an input terminal 11 connected to the input of a conventional univibrator or one-shot multivibrator 12, the output of which is coupled to the control grid of a triode type tube 13 through a coupling condenser 14. The control grid of the tube 13 is further connected to a biasing resistor 16 which, in turn, is connected to a source of biasing voltage 17 through a two-position switch 18. One position marked "Off" is connected to a source of negative voltage 19 through a series bank of batteries 21, the negative terminals of which are connected toward the "off" position. The second position of the switch 18 is marked "On" and is connected to the "off" position through a resistor 22 and to a resistor 23, the latter of which is connected to the positive terminal of a battery 24. The negative terminal of the battery 24 is connected to the junction between the positive terminal of the battery 21 and the negative voltage source 19. A further connection is made from the "off" position of the switch 18 to one end of a potentiometer 26, the other of which is connected to the junction between the positive terminal of the battery 24 and the resistor 23. The variable element of the potentiometer 26 is connected to the control grid of a second triode type tube 27 which is further connected to the negative voltage source 19 through a by-pass condenser 28. The cathode of the tube 27 is connected to the cathode of the tube 13 and to the negative source of voltage 19 through a resistor 29. The anodes of the two tubes 13 and 27 are interconnected and grounded through a dropping resistor 31 and are further connected to the control grid of a third triode type tube 32 by a lead 33. This latter tube 32 is connected into the circuit as a cathode follower; that is, the anode is connected to a source of positive voltage 34 by a conducting lead 36, and the cathode is connected to ground through two series-connected resistors 37 and 38. The junction between these two cathode resistors 37 and 38 is connected to an output terminal 39 through a conducting lead 41.

Now consider the operation of the circuit described above with the voltage sources 19 and 34 suitably energized and with the switch 18 thrown to the "off" position. Under these conditions the tube 13 is nonconducting, since the control grid is negatively biased beyond the tube's cut-off voltage by the battery and a negative voltage source 19. Thus, it is possible by adjusting the variable element of the potentiometer 26 to so control the bias voltage of the tube 27 that the tube conducts with a predetermined value of current. The current then flowing through the tube 27 causes a proportional voltage drop across the resistor 31 in the anode circuit; therefore, a predetermined bias voltage is produced at the control grid of the tube 32 and the conduction of the tube 32 is controlled to form a voltage across the resistor 38 equal and opposite to the steady state voltage of an external circuit.

With the above conditions existing, including the predetermined current flowing through the tube 27, the switch 18 is thrown to the "on" position which changes the control grid bias voltage of the tube 13 to allow the tube to conduct normally. Since both tubes 13 and 27 are conducting, there is a large voltage drop across the resistor 31, and the control grid bias voltage of the tube 32 is sufficient to maintain the tube 32 cut off.

Now, consider the condition where an input pulse of voltage is impressed at the input terminal 11. The univibrator circuit 12 is then actuated and produces a negative pulse of voltage which is coupled to the control grid of the tube 13. Thus, the current flow through the tube 13 decreases, and an increased bias voltage is impressed on the control grid of the tube 32 to make the tube conductive. Current flowing through the tube 32 develops a voltage across the cathode resistor 38 which is similar to the voltage impressed on the control grid, and an output pulse of voltage is developed which is free of the steady state voltage.

It is to be noted that the circuit of the present invention is useful in many types of measuring devices and in particular in measuring devices using ionization chambers for detecting and measuring charged particles. In the latter instance, an ionization device is connected to the input terminal 11 and an indicating circuit or device connected to the output terminal 39. The procedure to be used is to measure the steady state or background voltages with the switch 18 at the "on" position, then with the switch in the "off" position adjust the potentiometer 26 until the voltage developed at the control grid of the tube 32 is equal and opposite to the steady state voltage. Thereafter, with the switch 18 in "on" position accurate measurements can be made.

It is further to be noted that care has been taken in devising the circuit to eliminate circuit elements which mights cause transient voltages to occur, the primary precaution being taken by grounding variable voltages appearing at the control grid of the tube 27 through a by-pass condenser 28.

While the salient features of this invention have been described in detail with respect to one embodiment it will, of course, be apparent that numerous modifications may be made within the spirit and scope of the invention, and it is therefore not desired to limit the invention to the exact details shown except insofar as they may be defined in the following claims.

What is claimed is:

1. In an electronic circuit of the class described, the combination comprising an electron discharge device, a pair of control tubes connected to said electron discharge device, electrical supply means for establishing a predetermined current flow through the second of said control tubes, and means for controlling current flow through said first control tube in response to a signal voltage, whereby the current flow through said electron discharge device is controlled in response to the sum of the currents flowing through said control tubes.

2. In an electronic circuit of the class described, the combination comprising a cathode follower circuit, a pair of control tubes each having at least an anode, a control grid and a cathode, said control tubes having their anodes interconnected to the input of said cathode follower, adjustable electrical supply means for establishing a predetermined current flow through said second control tube, electrical supply means for maintaining said first control tube normally conducting, and means for connecting a signal voltage to said first control tube, whereby said control tubes drive said cathode follower in response to the sum of the current flowing therethrough.

3. In an electronic circuit of the class described, the combination comprising a vacuum tube having at least an anode, a control grid, and a cathode, a pair of control tubes each having at least an anode, a control grid, and a cathode, means for interconnecting the anodes of said control tubes and the control grid of said vacuum tube, an adjustable voltage divider network for establishing a predetermined flow of current through the second of said control tubes, electrical supply means connected to said first control tube for maintaining said first control tube normally conducting, and means connected to the control grid of said first control tube for controlling said first control tube in response to a signal voltage, whereby an output voltage is developed at the cathode of said vacuum tube which is less by a proportionate amount equivalent to said predetermined current flow through said second control tube.

4. In an electronic circuit of the class described, the combination comprising an electron discharge device having at least an anode, a control grid, and a cathode, a pair of control tubes each having anode, control grid and cathode circuits, the anode circuits of said control tubes being interconnected with the control grid of said device, a switch having a first position and a second position connected in the control grid circuit of said first control tube, electrical source means connected to said first switch position for negatively biasing said first control tube beyond cut-off and to said second switch position for positively biasing said first control tube, an adjustable voltage divider network for establishing a predetermined flow of current through said second control tube, and signal voltage means connected to the control grid of said first control tube, whereby an output voltage is developed at the cathode of said device which is less by a proportionate amount equivalent to said predetermined current flow through said second control tube.

BRUNO B. ROSSI.
HANS H. STAUB.

REFERENCES CITED

The following references are of record in the file of this patent:

UNITED STATES PATENTS

| Number | Name | Date |
|---|---|---|
| 2,244,239 | Blumlein et al. | June 3, 1941 |
| 2,252,613 | Bingley | Aug. 12, 1941 |

OTHER REFERENCES

Article, "A Triode Vacuum Tube Scale of Two Circuit," by Lifschutz & Lawson, pages 83–89, Review of Scientific Instruments, vol. 9, March 1938.

Article, "A Complete Geiger-Müller Counting System," by Lifschutz, pages 21–26, Review of Scientific Instruments, vol. 10, January 1939.